June 6, 1961 W. B. EDDISON ET AL 2,987,163
MACHINE FOR HANDLING CONTAINERS
Filed April 1, 1959 9 Sheets-Sheet 2

INVENTORS.
WILLIAM BARTON EDDISON
WARREN E. ERICKSON
BY
Andrus & Starke
Attorneys June 6, 1961 W. B. EDDISON ET AL 2,987,163
MACHINE FOR HANDLING CONTAINERS
Filed April 1, 1959 9 Sheets-Sheet 3

INVENTORS.
WILLIAM BARTON EDDISON
WARREN E. ERICKSON
BY
Andrus & Starke
Attorneys

INVENTORS.
WILLIAM BARTON EDDISON
WARREN E. ERICKSON
BY

Attorneys

June 6, 1961 W. B. EDDISON ET AL 2,987,163
MACHINE FOR HANDLING CONTAINERS
Filed April 1, 1959 9 Sheets-Sheet 7

INVENTORS.
WILLIAM BARTON EDDISON
WARREN E. ERICKSON
BY
Andrus & Starke
Attorneys

INVENTORS.
WILLIAM BARTON EDDISON
WARREN E. ERICKSON
BY

Andrew & Starke

Attorneys

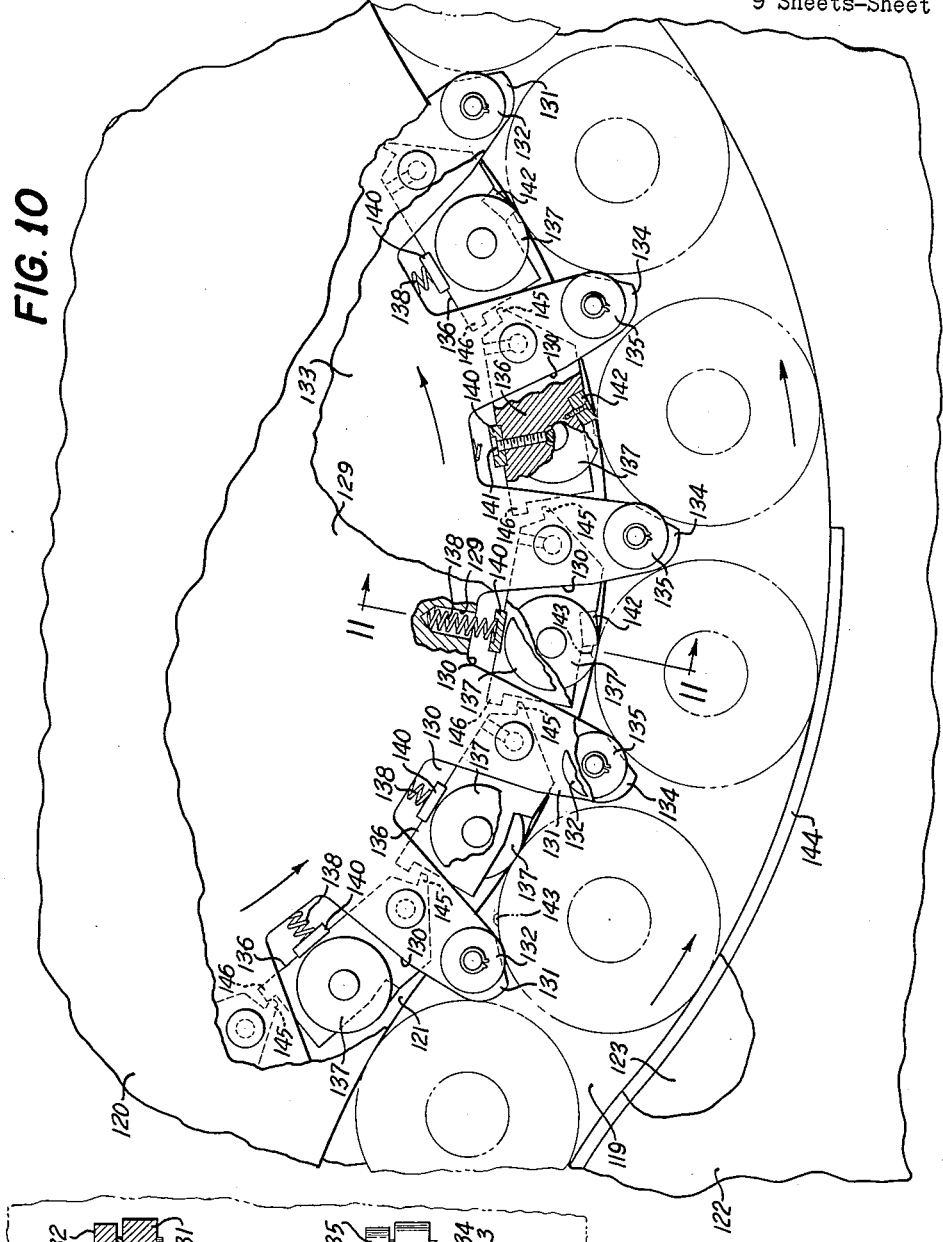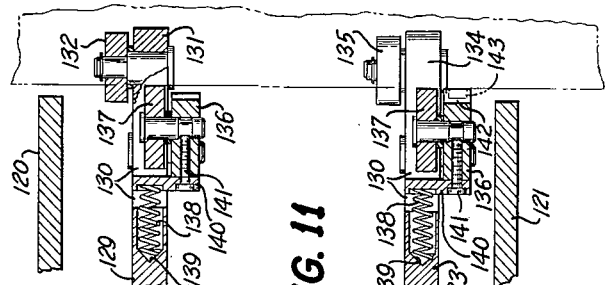
FIG. 10
FIG. 11
INVENTORS.
WILLIAM BARTON EDDISON
WARREN E. ERICKSON
Attorneys

United States Patent Office 2,987,163
Patented June 6, 1961

2,987,163
MACHINE FOR HANDLING CONTAINERS
William Barton Eddison, Ardsley-on-Hudson, N.Y., and Warren E. Erickson, Madison, Wis., assignors to Gisholt Machine Company, Madison, Wis., a corporation of Wisconsin
Filed Apr. 1, 1959, Ser. No. 803,406
11 Claims. (Cl. 198—22)

This invention relates to a machine for handling containers, and more particularly to a machine for handling bottles and the like moving in a substantially continuous stream for presentation thereof to a sealing, labeling, capping, filling, or other similar apparatus.

One of the most commercially successful machines for applying seals to capped bottles has been the one disclosed in U.S. Patent No. 2,835,088, granted to the present inventors on May 20, 1958, together with certain features thereof disclosed in patents and applications of the present inventors which are referred to in the above-mentioned patent.

The machine of the present invention embodies a bottle handling mechanism which is believed a substantial improvement over the handling mechanism shown in the above patents and applications, and which is highly simplified thereover.

The machine is capable of handling round or flat bottles ranging in size from about ½" in diameter to gallon jugs, with very little time needed for changeover, i.e., about five minutes.

In carrying out the invention, a drive mechanism is provided which drives a continuously moving article conveyor. An article transfer table is connected through a gear train to the drive mechanism, with the table having a plurality of pockets of a selected size and number to receive articles of a corresponding size. The table is quickly replaceable by one having different size and number of pockets to accommodate articles of correspondingly different size. Similarly, the gear train is provided with a gear which is quickly replaceable with one which changes the rotational speed of the table to correspond with the different size articles, thus keeping the through put speed of the apparatus constant.

A series of short dwells may be provided in the table drive, which permits capping, sealing or labeling of the articles at a work station. The index time is substantially greater than the dwell time, and the number of dwells per minute remains constant, regardless of article size.

It has been found desirable to be able to stop the machine without stopping the main drive motor. For this purpose, a clutch is disposed in the drive which provides variable output speeds and disengagement below a minimum speed.

The article carrying table may be provided with a spotting mechanism directly thereon, thus eliminating separate drive mechanism for a separate spotter.

The accompanying drawings illustrate the best mode presently contemplated by the inventors for carrying out the invention.

In the drawings:

FIG. 10 is a fragmentary plan view of a bottle spotting apparatus mounted on the table assembly, and FIG. 11 is a vertical section taken on line 11—11 of FIG. 10.

Figure 1:
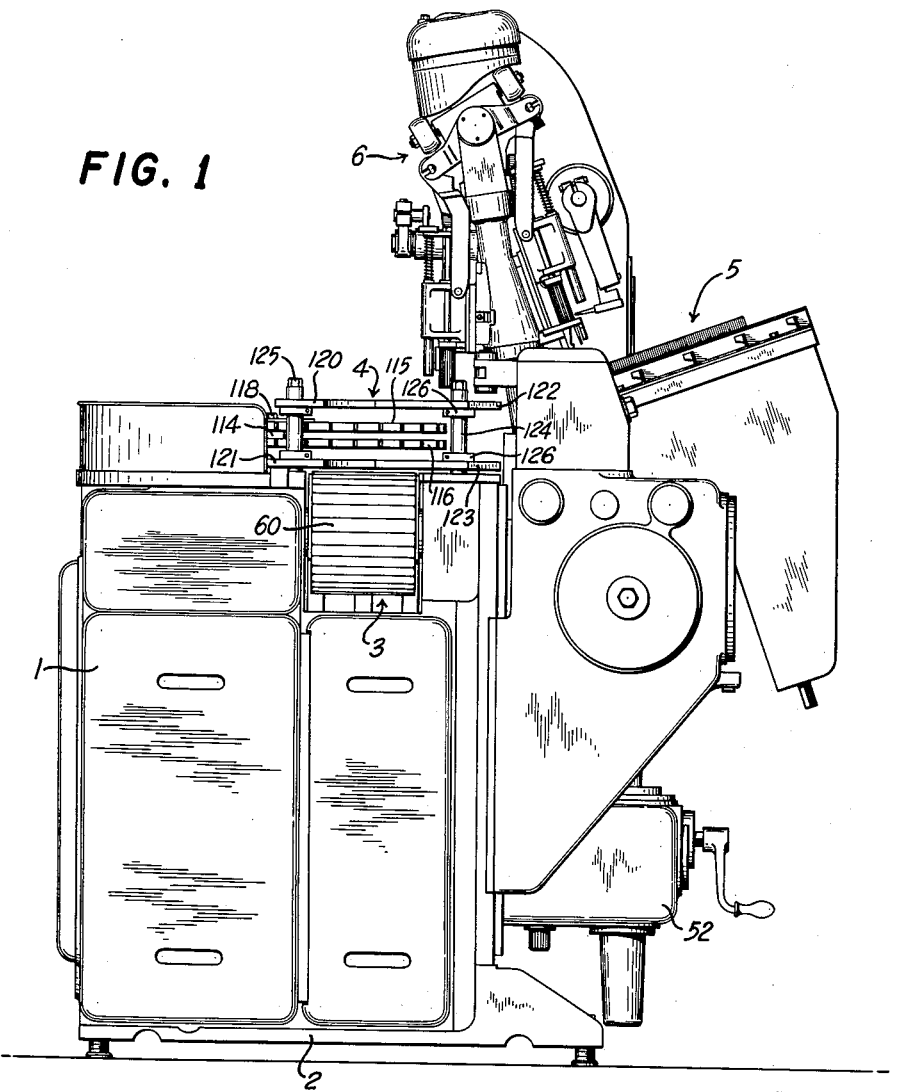
FIGURE 1 is a side elevation of a machine constructed in accordance with the invention.

As shown in the drawings, the machine is normally partially covered by a plurality of cover members 1, and comprises a frame 2 which supports the drive mechanism, a longitudinal conveyor 3, and a circular table assembly 4 for carrying the stream of bottles in intermittent fashion for sealing or the like. The machine illustrated is adapted to carry a seal magazine feed apparatus 5 and a seal applying mechanism or the like, indicated at 6.

Magazine feed apparatus 5 is described more fully in the present inventors' U.S. Patent No. 2,794,636, and is also described in conjunction with the machine of the present invention in the present inventors' co-pending application entitled Apparatus for Applying Seals to Containers, Serial No. 803,402, filed on even date herewith.

The seal applying mechanism 6 is disclosed in detail in the above-identified copending application.

The machine drive mechanism comprises an electric motor 7 of any suitable well-known type carried within and by frame 2 and adjacent one end thereof and having a dual groove sheave 8 mounted for rotation with the longitudinally extending motor output shaft. A belt 9 is mounted in one of the grooves of sheave 8 and extends downwardly in a rearwardly direction for driving engagement with an intermediate sheave 10 keyed to the outer end of a longitudinal drive shaft 11. Shaft 11 is disposed for rotation in suitable bearings 12 and 13 in frame 2 and extends into the frame. The output of shaft 11 drives a vacuum pump 14 of any suitable well-known type, and comprises a belt 15 which drivingly connects a sheave 16 on the inner end of shaft 11 and a similar sheave 17 carried by the input shaft of pump 14.

Pump 14 is utilized to provide a vacuum in response to rotation of shaft 11, for use in applying seals to the bottles passing through the machine. Details of this construction are disclosed in the above mentioned copending application.

The second groove of motor sheave 8 is also provided with a belt, indicated at 18, which is disposed inwardly of belt 9 and extends downwardly in a rearward direction to the input sheave 19 of the machine's main drive clutch 20, mounted on frame 2.

A suitable tensioning device is provided for belt 18, and comprises an auxiliary sheave 21 mounted for rotation on a take-up plate 22 which is adjustably carried by the machine frame.

Figure 5:
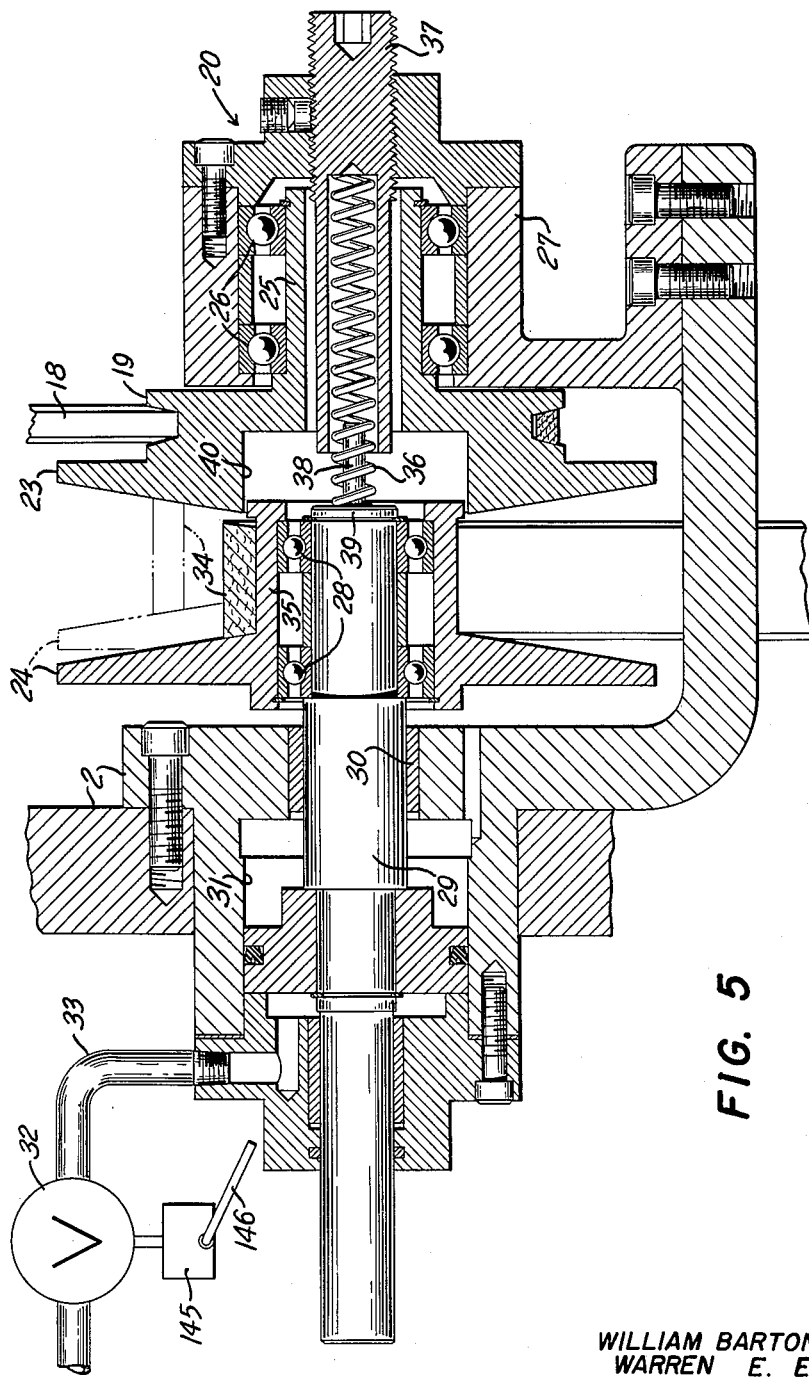
FIG. 5 is a vertical section of the variable speed clutch taken on line 5—5 of FIG. 4.

Clutch 20 is of the variable speed type and permits variable output with disengagemnet below a minimum speed with an operating input. For this purpose, a driving cone pulley member 23 is mounted for rotation as a part of sheave 19, and a driven cone pulley member 24 is facing and disposed coaxially and inwardly of pulley member 23. As best shown in FIG. 5, pulley member 23 is provided with an outwardly extending hub 25 disposed for rotation in bearings 26 mounted within an annular retainer 27 on the machine. Pulley member 24 is mounted for rotation independent of pulley member 23 on bearings 28 disposed on the outer end of a control piston 29.

Piston 29 extends inwardly from pulley member 24 and through a sleeve bearing 30 in an upstanding wall portion of frame 2. For actuation purposes, the inner end of piston 29 is received within a cylinder 31 forming part of the frame wall, and may be actuated to move pulley member 24 axially relative to pulley member 23 by any suitable well-known hydraulic means, such as the solenoid valve 32 connected to the rear portion of the cylinder by a line 33.

Clutch 20 is adapted to actuate the machine through a drive belt 34, one end of which is disposed between pulley members 23 and 24 and which normally rests on the surface of the outwardly extending hub 35 of pulley member 24.

As shown in full lines in FIG. 5, when the clutch is not operating, pulley member 24 is in the retracted position, and no rotative forces are transmitted to belt 34, even with motor 7 and pulley member 23 rotating. Pulley member 24 is maintained in the non-drive position when valve 32 is open to drain, and by a spring 36 received within an axial bore in a longitudinally extending plug 37 threaded within a removable cap portion of retainer 27. Spring 36 is centered by a pin 38 carried by the adjacent end of piston 29, and is biased against a cap 39 on the end of the piston.

When it is desired to drive the apparatus through clutch 20, valve 32 is actuated to flow pressure fluid through line 33 and actuated piston 29 to force pulley member 24 toward pulley member 23. As this occurs, hub 35 will be received within a bore 40 in pulley member 23, and belt 34 will rise on the facing inclined surfaces of the pulley members and be rotatably driven, as shown in phantom in FIG. 5. The farther from the clutch axis belt 34 moves, the faster will be the resultant output speed of the belt.

The desired spacing of pulley members 23 and 24 and thus machine drive speed may be adjusted by threadably turning plug 37, which limits the rightward movement of piston shaft 29 by engagement thereby. If desired a dial or the like not shown, may be mounted on the capped portion of retainer 27 to provide a visual indication of the output speed adjustment.

Figure 3:
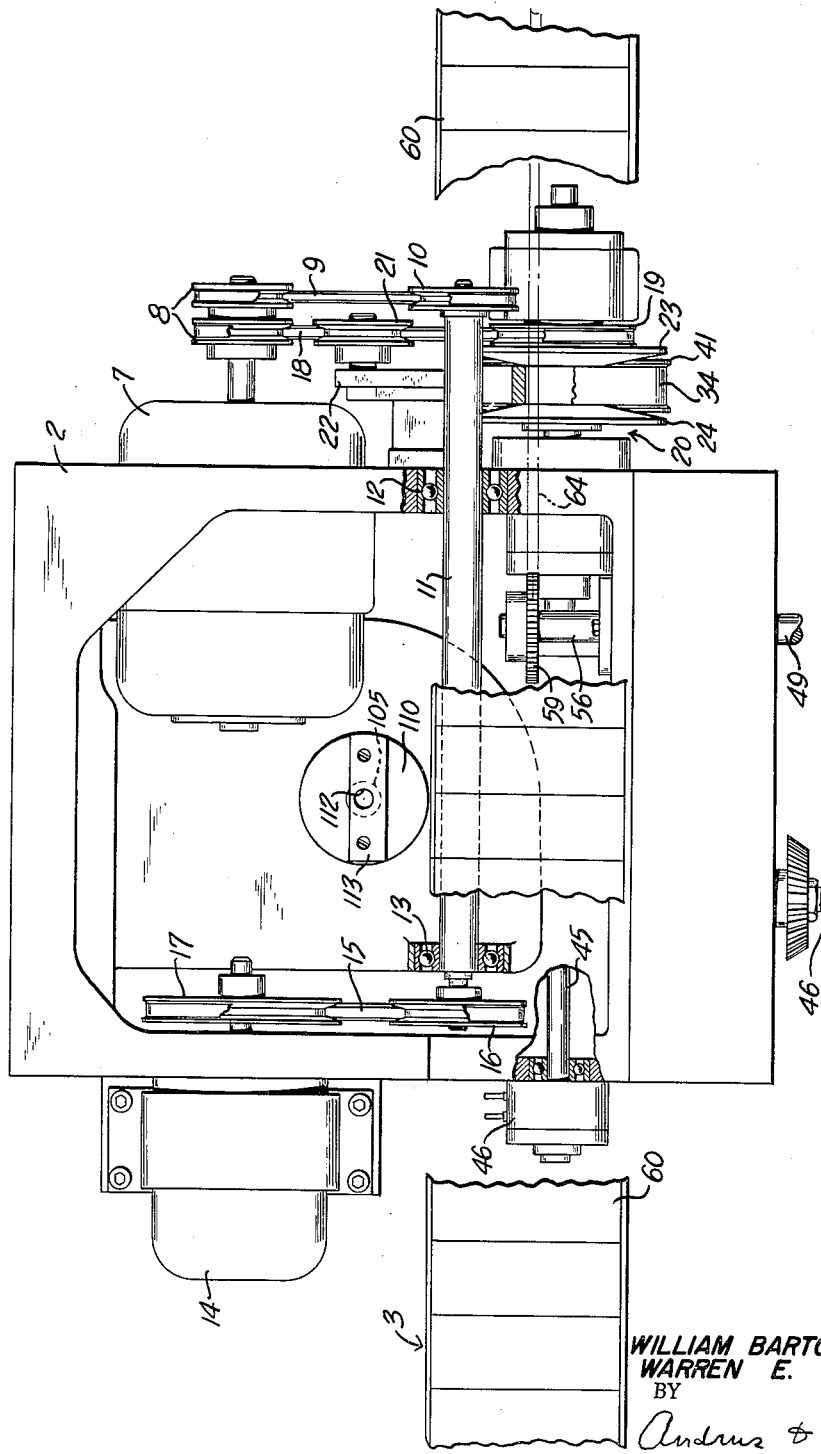
FIG. 3 is an enlarged top plan view of a portion of the apparatus of the invention, showing the drive, and with parts broken away and removed for purposes of clarity.
Figure 4:
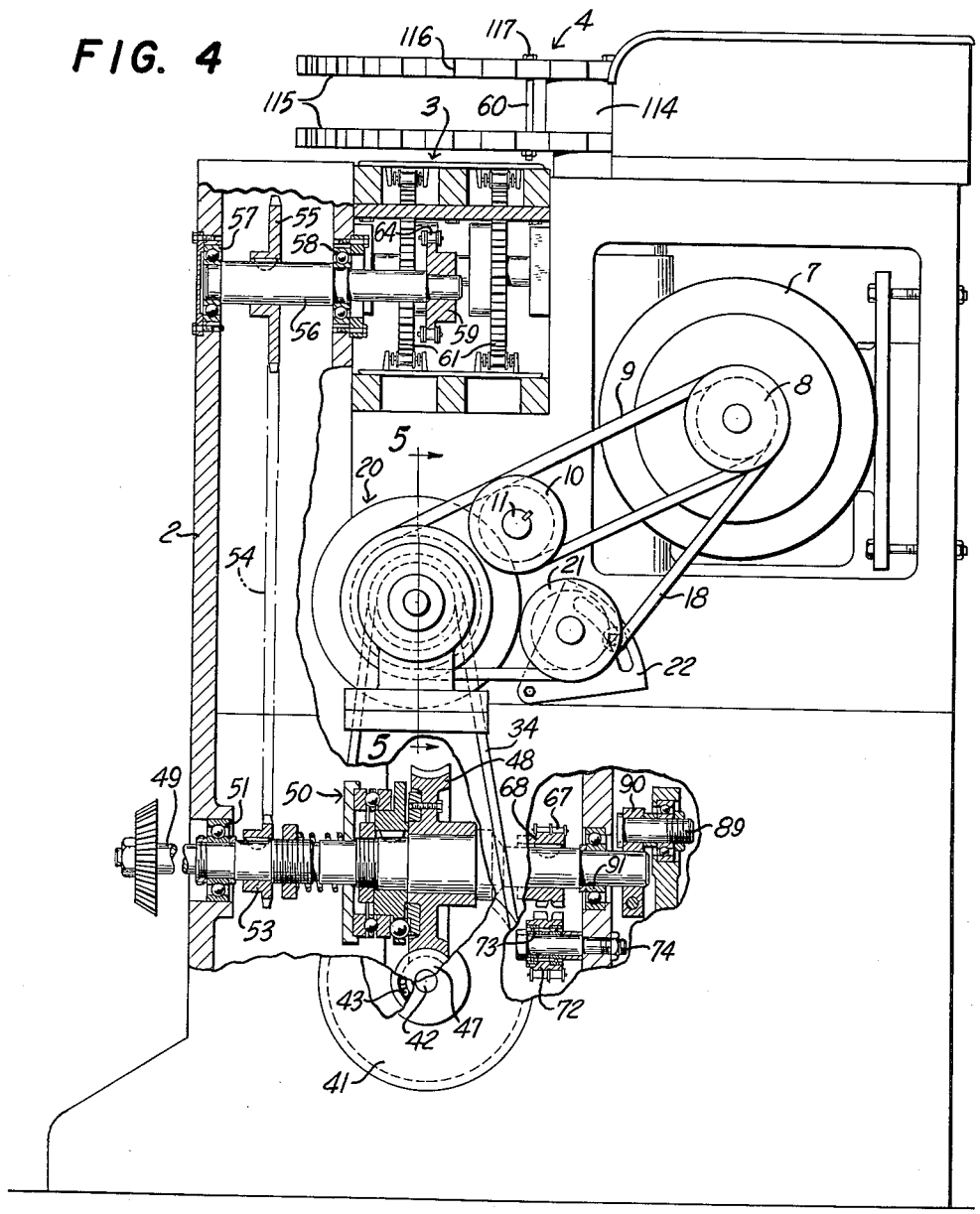
FIG. 4 is an enlarged end elevation taken from the end opposite that of FIG. 1, showing the constant speed clutch and drive and the conveyor mechanism, with parts broken away and removed for purposes of clarity.
Figure 9:
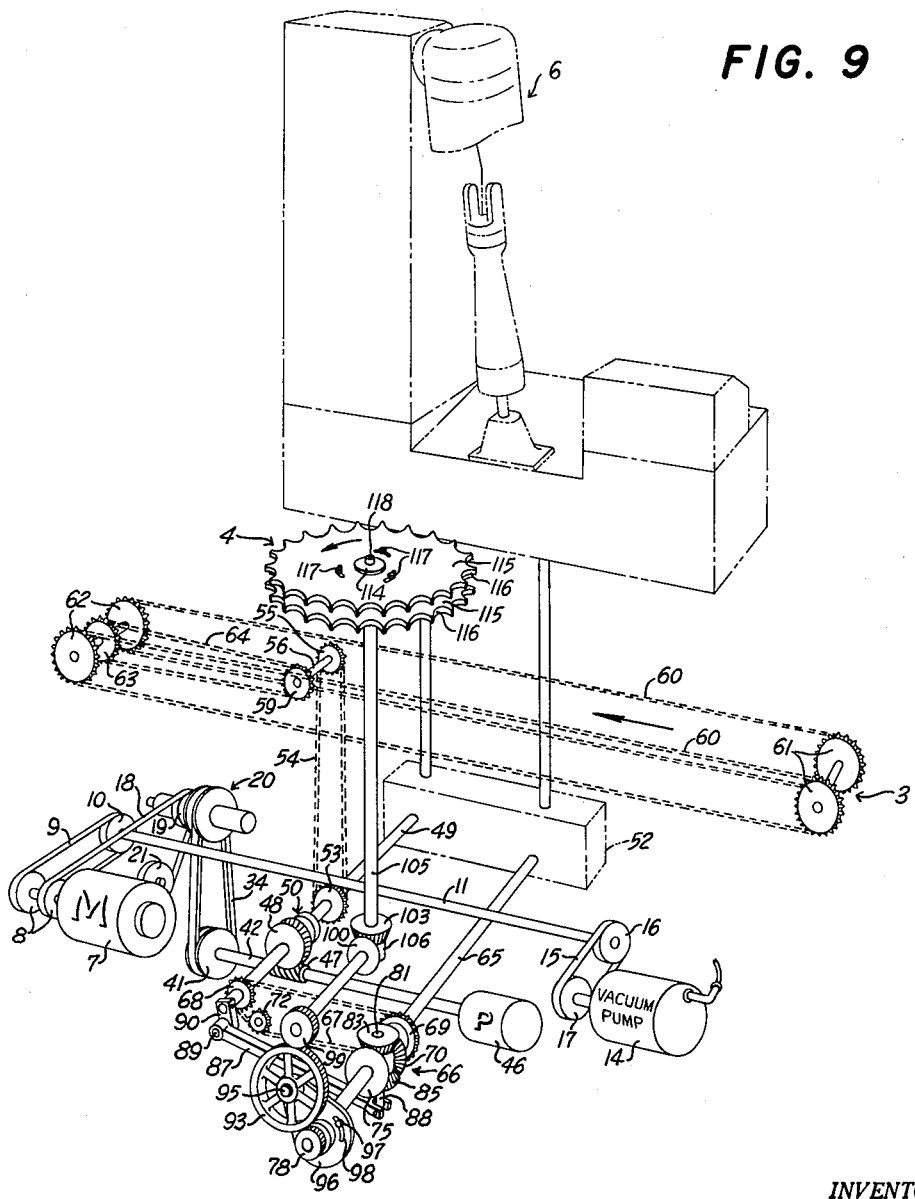
FIG. 9 is a generally schematic showing of the apparatus of the invention.

Belt 34 extends downwardly from clutch 2 and is drivingly received by a sheave 41 secured on the outer end of a longitudinal worm shaft 42 mounted for rotation in bearings 43 and 44 in frame 2. As shown in FIGS. 3 and 9, worm shaft 42 is provided with an extension shaft 45 which drives an oil pump 46 disposed generally beneath vacuum pump 14. Pump 46 is adapted to lubricate the working mechanisms of the machine through numerous oil lines, not shown.

Worm shaft 42 is driven at a constant speed throughout a machine cycle from motor 7, and is provided with a worm 47 thereon which meshes with a corresponding gear 48 loosely mounted on the central portion of a transversely extending constant speed main output shaft 49 disposed slightly above and crossing shaft 42.

Shaft 49 is directly driven from shaft 42, through a suitable torsion-release or other type safety clutch 50 disposed thereon and normally disposed in driving engagement with gear 48. The rear end portion of shaft 49 is mounted for rotation in a bearing 51 in frame 2, and passes outwardly thereof into a miter box 52 carried at the rear of the machine. Box 52 encloses the driving connection between the bottle handling apparatus and the seal applying mechanism 6, described in detail in the inventors' above-mentioned co-pending application.

Conveyor 3 is driven from shaft 49 via a chain and sprocket drive which comprises a sprocket 53 keyed to shaft 49 between worm gear 48 and bearing 51 and a roller chain 54 extending upwardly therefrom within a vertical extension of frame 2 and drivingly engaging a second sprocket 55 keyed to a short transvesre shaft 56. The latter is mounted for rotation in suitable bearings 57 and 58 and extends forwardly outside of the frame and into a longitudinal channel-space formed by the walls thereof. A conveyor drive sprocket 59 is secured to the outer end portion of shaft 56.

Conveyor 3 is shown as being centrally mounted within the said frame channel-space, and extending longitudinally from each end thereof to provide a unitary intake and discharge for bottles passing through the machine. As shown schematically in FIG. 9, conveyor 3 is of a type similar to that disclosed in the inventor's above-mentioned U.S. Patent No. 2,835,088, and comprises a conveyor chain 60 supported at its opposite ends by large double sprockets 61 and 62 which reverse the chain between its upper and lower course. The sprocket 62 at the discharge end of chain 60 serves as the chain drive sprocket pulling the upper course of the chain toward it.

For this purpose a chain sprocket 63 is secured on the shaft of the chain drive sprocket 62. Sprocket 63 is driven by a chain 64 from conveyor drive sprocket 59.

The mechanism just described provides a drive from motor 7 through clutch 20, and shafts 42 and 49 to both the seal applier 6 and conveyor 3.

Another transverse shaft 65 generally parallel to shaft 49 is adapted to be driven intermittently therefrom by a differential drive 66 mounted on shaft 65, the latter providing the drive control for table assembly 4. Differential 66 is of the type providing a substantial excess of index time over dwell time.

For this purpose, an input is provided from shaft 49 to differential 66 by a chain 67 connecting a sprocket 68 on shaft 49 and a sprocket 69 keyed to a forwardly facing bevel gear 70 mounted for rotation on shaft 65 by bearings 71 disposed therebetween.

Figure 7:
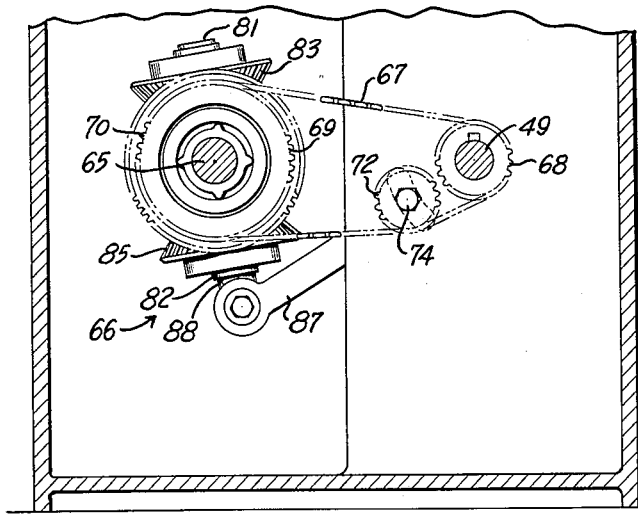
FIG. 7 is a vertical section showing the differential drive taken generally on line 7—7 of FIG. 6, and also showing the constant speed input thereof.

For purposes of tightening chain 67 to prevent any back-lash in the mechanism, an idler sprocket 72 also engages the chain, with sprocket 72 being mounted for rotation on bearings 73 on an idler shaft 74. The latter is adjustable about the axis of shaft 49, as best shown in FIG. 7.

A rearwardly facing bevel gear 75 is fixedly splined to shaft 65 and is spaced forwardly from bevel gear 70. Shaft 65 extends forward of gear 75 and through bearings 76 in a cap 77 carried by housing 2. A small spur gear 78 is keyed for rotation with the front end of shaft 65, for purposes to be described.

Figure 6:
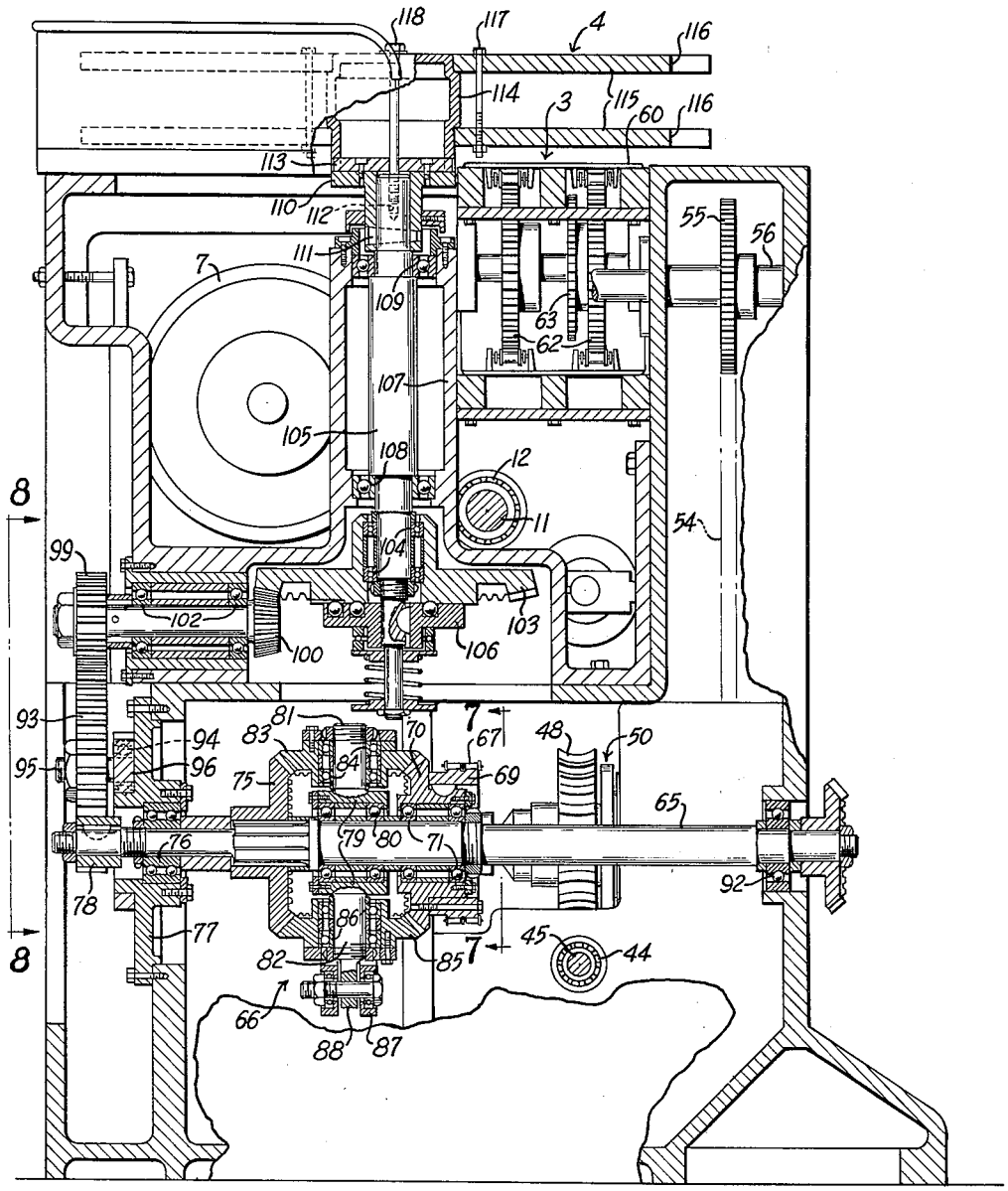
FIG. 6 is a vertical section through the machine showing the intermittent table drive and with parts broken away.
Figure 8:
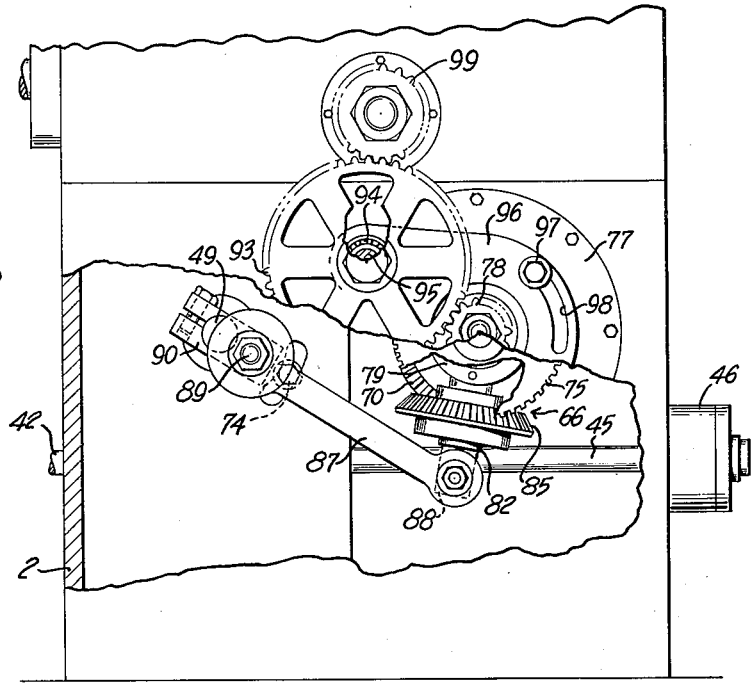
FIG. 8 is a front elevation of the table drive taken generally on line 8—8 of FIG. 6, with parts broken away and sectioned, and also showing the differential crank input.

Gear 70 comprises an input for the differential, while gear 75 comprises the output thereof, and both gears have the same number of teeth. These gears are drivingly connected by structure comprising a hub 79 mounted for rotation on bearings 80 disposed on shaft 65 between the two bevel gears 70 and 75. Hub 79 supports a pair of diametrically opposed radially extending spindles 81 and 82 which are disposed at right angles to the axis of shaft 65. As shown in FIGS. 6 and 7, upper spindle 81 carries a miter gear 83 rotatable on bearings 84, while lower spindle 82 carries a similar miter gear 85 rotatable on bearings 86. Gears 83 and 85 are disposed facing each other on a transverse axis, have the same number of teeth, and each gear meshes with gears 70 and 75.

The entire differential assembly is maintained in proper position on shaft 65 by a plurality of retaining nuts, spacers and the like which are shown in the drawings but not assigned reference numerals for purposes of clarity.

Rotation of gear 70 will be transmitted through gears 83 and 85 to gear 75 and thus to shaft 65. If hub 79 and spindles 81 and 82 remained fixed relative to the axis of shaft 65, the drive ratio between shafts 49 and 65 would be one to one, if sprockets 68 and 69 were equal in size, and output shaft 65 would rotate at a uniform speed.

However, since it is desirable to provide intermittent motion of table 4 and mechanism 6, it is necessary to regularly vary the speed of rotation of shaft 65. For this purpose, a link 87 is pivotally mounted at one end to a connecting rod 88, which forms a radial extension of spindle 82. The other end of link 87 is pivotally mounted on a shaft 89 disposed in a crank arm 90 secured for rotation with the forward end portion of main output shaft 49, the latter being suported for rotation in front bearings 91.

As shaft 49 rotates at a uniform speed, link 87 oscillates hub 79 and gears 83 and 85 about the axis of shaft 65. When hub 79 is oscillated, shaft 65 will either be speeded up or slowed down relative to shaft 49, depending upon whether gears 83 and 85 are moved as a unit in a direction opposite to the direction of rotation of gear 70, or in the same direction.

Shaft 65 is journaled at its rear end in bearings 92 in frame 2, and also extends into miter box 52 in a manner similar to shaft 49 for driving connection to the seal applying mechanism 6.

For purposes of driving mechanism 6, it is desirable to provide a dwell for each 180° of rotation of shaft 65. This is accomplished by making the drive ratio between sprocket 68 and sprocket 69 one to two. In addition the ratio between sprocket 69 and bevel gears 70 and 75 is one to one, so in effect the ratio between gear 75 which positively drives shaft 65 and sprocket 68 is two to one. Thus, for every complete 360° rotation of shaft 49 and complete cycle of crank arm 90, shaft 65 will rotate through approximately 180° and then dwell.

Besides being transmitted to miter box 52, the resultant intermittent rotation of shaft 65 is also transmitted to drive table assembly 4 through spur gear 78 which meshes with an intermediate gear 93 which is mounted for rotation on bearings 94 carried by a stub shaft 95 disposed parallel to shaft 65. Shaft 95 is adjustable about shaft 65 by the fact that it is carried by a plate 96 which is adjustably rotatable about the axis of shaft 65 and is selectively tightened to frame 2 by bolts 97 received through curved slots 98 in the plate.

Intermediate gear 93 meshes with and drives a change gear 99 which is removably secured to the forward end portion of a pinion bevel gear member 100 by a keyed sleeve 101 or the like. The pinion portion of member 100 is suported for rotation in bearings 102 in frame 2, while the inner end portion of member 100 constitutes the bevel gear which meshes with a large downwardly facing bevel gear 103 mounted on bearings 104 for rotation about the lower end portion of the vertical table shaft 105. Gear 103 is normally connected for rotation with table shaft 105 by a suitable safety clutch 106, but is disconnected therefrom by the clutch if the load on table assembly 4 becomes too great, as when a bottle is broken or jams in the mechanism.

Shaft 105 extends upwardly through a protective housing 107 which carries bearings 108 and 109 for the shaft, and terminates in a small table mount member 110 which is keyed thereto by a tapered pin 111 or the like. The upper end of shaft 105 is provided with a vertically extending threaded axial bore 112. The top surface of member 110 is provided with an offset key 113 which projects upwardly therefrom and is adapted to receive a complementary offset groove on the lower face of the hub 114 of table assembly 4. The complementary offset key and groove assure proper registry of table assembly 4 with the rest of the apparatus at all times.

Figure 2:
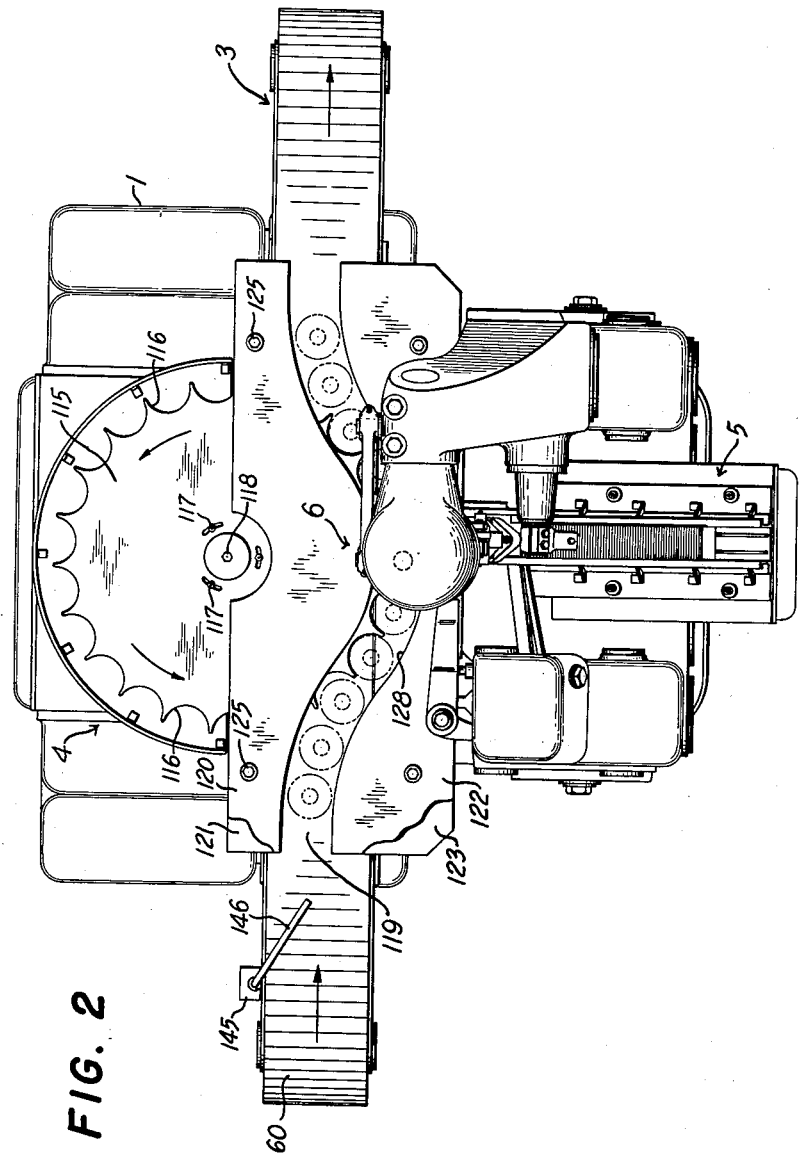
FIG. 2 is a top plan view of the machine.

As shown in FIGS. 2, 6 and 9, table assembly 4 comprises the central hub 114 and a pair of vertically spaced wheels 115 mounted on the hub and having a plurality of circumferentially spaced peripheral bottle receiving pockets 116 with the pockets on each wheel in vertical alignment with the corresponding pockets on the other wheel. Wheels 115 are held in place by a plurality of bolts 117 which pass through arcuate slots to permit relative adjustment of the wheels thereon. The entire assembly 4 is rigidly secured for rotation with shaft 105 by a large bolt 118 which extends downwardly through hub 114 and is threadably received by bore 112.

During operation of the machine, bottles are fed to the intake portion of conveyor 3 from the line conveyor, not shown, and are carried toward table assembly 4. The bottles first enter a guide track 119 formed by a pair of relatively frictionless spaced upper and lower front guide plates 120 and 121, and a pair of similarly spaced upper and lower rear guide plates 122 and 123.

Plates 120–123 are carried on suitable locating tubes 124 which are bolted to frame 2 by stud-bolts 125. The plates are clamped to tubes 124 and properly spaced apart by spacer clamps 126.

Upper plates 120 and 122 are disposed above pocket wheels 115 while lower plates 121 and 123 are disposed therebeneath.

As best seen in FIG. 2, track 119 carries the stream of bottles from their straight path on conveyor 3 in a rearwardly curved direction and feeds the bottles into successive pockets 116 as the overlapping table assembly 4 turns in the direction indicated.

Operation of the apparatus is as follows: As bottles move down the line they are transferred to the intake portion of conveyor chain 60. However, as the bottles enter track 119, their path is changed from straight line to curved and each bottle is fed to a pocket 116. The table assembly 4 rotates counterclockwise at all times, and in intermittent fashion. That is, the dwell provided by differential 66 is transmitted to table 4.

The dwell of table 4 is substantially instantaneous and is for the purpose of permitting the application of seals, labels or the like to the indexed bottles. With the described construction, the length of time allotted for table indexing is approximately nine times the dwell time. This is much more desirable from the standpoint of total capacity and smoothness of operation than would be a machine utilizing a Geneva or similar drive having a relatively long dwell and short index time.

As the bottles intermittently approach a station beneath mechanism 6, they are maintained in pockets 116 by the forwardly facing edges 128 of plates 122 and 123. When a bottle reaches said station and dwells, a seal or the like is applied thereto, and the bottle then continues intermittently with the table and is finally discharged freely from track 119 for continued movement on chain 60.

The surface of chain 60, which moves at a predetermined uniform speed, is of a type to permit substantially free slippage with the bottles.

For time-saving purposes, it is desirable that motor 7 be kept running at all times when the main line is in operation, regardless of whether bottles are passing through the apparatus or not. Clutch 20 provides variable speed output and disengagement below a minimum speed and motor 7 can run continuously regardless of any temporary stoppage of the machine. Valve 32 selectively engages and disengages clutch 20, as well as providing variable output thereof.

In addition, manual or automatic adjustment of plug 37 controls the maximum output speed of the apparatus.

In some instances it may be desirable to index the bottles about their own axes so that they are properly oriented for seal applying and the like. Such bottles usually carry a lug or depression adapted to be engaged by a spotting mechanism at the point of proper orientation. The spotting mechanism may be placed adjacent the intake side of table 4, and may be similar to that disclosed in the present inventors' U.S. Patent No. 2,843,252 entitled Spotting Device. In this instance, a portion of the intake end of plates 122 and 123 might have to be removed to accommodate the spotting mechanism.

It may be desirable to spot the bottles on table assembly 4 itself. As shown in FIGS. 10 and 11, an upper table wheel 129 is provided with a plurality of circumferentially spaced pockets 130 defined by radially outwardly extending flanges 131. The outer end portion of each flange 131 is provided with a bottle engaging roller 132.

A lower table wheel 133 also has similar spaced radial flanges 134 with bottle engaging rollers 135.

The mechanism is shown as being mounted on both wheels 129 and 133 and comprises a flat pivot arm 136 pivotally mounted on each flange 131 and 134 and extending clockwise therefrom beneath the wheel pocket. Each arm 136 carries a roller 137 on a vertical shaft, with said roller being disposed above the arm and normally engageable with a bottle by the biasing action of a spring 138 mounted in a radial bore 139 in each of wheels 129 and 133.

Spring 138 extends outwardly from bore 139 and bears against a downwardly extending spring stop 140 which is adjustably secured to arm 136 by a screw 141.

To spot the bottles, a small stop member 142 is secured to arm 136 on lower wheel 133 so that member 142 is beneath roller 137 with its edge in the path of and at the same height as a projection 143 on the bottle wall. As the bottles move into wheels 129 and 133 from track 119, they are drivingly engaged by rollers 132, 135 and 137. Furthermore, as the bottles follow around with the table, they are forced to rotate on their own axes by friction contact with leather strips 144 secured to the edges of guide plates 122 and 123. Projection 143 will finally engage stop 142 and the bottles will be fixedly oriented prior to positioning for sealing and the like.

Spotting of bottles will always occur prior to the sealing station, since the arcuate edge of plates 122 and 123 contacted by the bottles before the station is longer than the circumference of the bottles.

Outer pivoting of each arm 136 is limited, as when no bottle is in the pocket, by a shoulder 145 on the leading end of each arm 136 which is engageable by a projection 146 on the following end of the adjacent arm.

The structure of the apparatus provides extreme versatility for handling containers of different sizes. The apparatus shown is set up for handling quart-size whiskey bottles or the like. In this instance, guide plates 120–123 and pockets 116 are of the proper size for handling and receiving such bottles. Change gear 99 has the same size teeth as gear 93 and is of a diameter to provide the necessary distance of index movement of table 4 between each dwell.

Changing the machine to accommodate containers of other sizes is extraordinarily simple, and has been found to take only about five minutes. For example, if large gallon jugs are to be processed, guide plates 120–123 are quickly removed by removing stud bolts 125, and are replaced with plates providing a much wider track 119. Table assembly 4 is quickly removed by removing bolt 118, and is replaced with an assembly having wheels 115 with much larger pockets 116. In this instance, the number of pockets may decrease from about twenty to seven or eight. The only other change necessary is to replace gear 99 with one having the same size teeth but correspondingly smaller diameter. This will require adjustment of intermediate gear 93 about the axis of shaft 65.

The smaller size of new gear 99 will provide a greater index distance between dwells of table 4, with the said distance being that between pocket centers.

Very small diameter containers may also be handled by a similar quick change of guide plates, table assembly and change gear 99.

Quick access to gear 99 is made possible by the fact that it is at the end of a gear train (78—93—99) and is disposed outside frame 2 adjacent the front wall thereof. Plates 120–123 and table 4 are similarly exposed.

Regardless of bottle size, the construction permits circumferentially sweeping the bottles around hub 114 so that the bottle centers are always on the same hub radius so that no readjustment of mechanism 6 is necessary for different size bottles.

Since the time for each intermittent index-dwell cycle remains the same at all times, the number of containers put through the apparatus per minute will automatically remain constant regardless of their size since the diameter of gear 99 is always correlated to the size of the bottles and gear 99 is at the end of a gear train. As contrasted with small bottle handling, large bottle handling will require a greater index distance for table 4 with a resultant higher index speed between dwells.

To coordinate operation of the machine with the bottling line, a suitable switch 145 is disposed adjacent the intake portion of conveyor 3. (FIGS. 2 and 5). Switch 145 has an arm 146 which extends into the bottle path. When the line supplies a stream of bottles to the machine, arm 146 will be contacted thereby and held back. In this position, switch 145 will control solenoid valve 32 to engage clutch 20. If bottles cease coming down the line, arm 146 will spring out and cause switch 145 to actuate valve 32 to slow down and disengage the output of clutch 20. The entire apparatus then stops until additional bottles are fed down the line.

The basic unit of the apparatus has been found capable of handling about 120 containers per minute with substantially no breakage. The table construction permits indexing of the containers a distance only slightly greater than a container diameter between dwells.

Various modes of carrying out the invention are contemplated as being within the scope of the following claims particularly pointing out and distinctly claiming the subject matter which is regarded as the invention.

We claim:

1. Article transfer mechanism for feeding articles of a given size successively to a work station and removing the articles successively therefrom, comprising a continuously moving conveyor for said articles, an intermittently driven rotary transfer table overlapping a central portion of said conveyor to control the transfer of successive articles thereby, said table having a series of circumferentially spaced peripheral pockets for individually receiving successive articles and of a size corresponding to the given article size, the intermittent rotation of said table effecting a dwell in the movement of each successive article to provide a work station therefor, said table being replaceable with selected tables having different sizes and numbers of article receiving pockets, and means to selectively drive said table at different rotational speeds corresponding to the circumferential distance between pocket centers to maintain substantially the same time cycle of through put for each individual article irrespective of the table replacement.

2. The construction of claim 1 in which said table is driven by differential gearing wherein the intermediate gears are shifted rotationally alternately with and against the direction of rotation of the input gear to provide a dwell time generally shorter than the time required for the indexing movement of the table between dwells.

3. The construction of claim 1 in which said last named means comprises a replaceable gear in a train of drive gears.

4. The construction of claim 1 in which the time ratio between the index movement and the dwell in each cycle is greater than 1::1 and may be as high as 9::1.

5. The construction of claim 1 wherein the several selective tables have their pocket centers spaced substantially on the same radius for the table whereby the interchanging of tables for different article sizes does not require adjustment of the relative location of apparatus employed at the work station.

6. The construction of claim 1 in which the table is intermittently driven from a constant speed source by a differential gearing, and a crank driven from said source is connected to rotationally shift the position of intermediate gears in said differential gearing to provide the alternate index drive and dwells for said table.

7. The mechanism of claim 1 which includes a drive motor, and a variable speed clutch disposed in the drive between said motor and the remaining mechanism, and means to provide a range of speed adjustments of the output portion of said clutch with said range including zero speed output so that the said remaining mechanism may be stopped while the motor continues to operate.

8. The mechanism of claim 1 which includes rail means for guiding the articles as they are carried by said table, spotter means carried by said table and disposed adjacent each said pocket for axially aligning the articles to a predetermined position, and friction-producing means on said rails to rotate the articles in the pockets during spotting.

9. An article transfer mechanism comprising, a frame, a motor carried by said frame, a variable speed clutch having an output shaft and drivingly connected to said motor and selectively adjustable to provide a range of clutch output shaft speeds including zero shaft speed when said motor is operating, an article conveyor drivingly connected to the said clutch output shaft and movable in response to the adjusted speed thereof, a rotary table mounted adjacent said conveyor and disposed and constructed to receive and discharge a plurality of articles in succession on said conveyor; said mechanism including a station at which said table presents an article for sealing, labeling or the like; and means drivingly connecting said table and said output shaft, comprising a differential having an input connected to said clutch output shaft and with said differential having an output shaft, a crank connected between said first named output shaft and said differential to provide an index-dwell motion to the second-named output shaft, a drive gear on said second-named output shaft, an intermediate gear meshing with said drive gear and adjustable about the axis of the latter, and a third gear meshing with said intermediate gear and rotatably disposed to drive said table therefrom; said drive, intermediate and third gears forming a gear train disposed outwardly of said frame for easy access by the operator, and with the said third gear being at the end of the train and quickly removable for replacement by a gear of different diameter but same size teeth whereby the index-dwell movement of the table will be the same in time but different in distance; said differential being constructed to provide an index-dwell time ratio of about nine to one.

10. Article transfer mechanism for feeding articles of a given size successively to a work station and removing articles successively therefrom, comprising, a drive mechanism, a continuously moving conveyor for said articles and driven by said drive mechanism, a gear train connected with said drive mechanism, and a rotary transfer table rotated by said gear train and overlapping a central portion of said conveyor to control the transfer of successive articles thereby, said table having a series of circumferentially spaced peripheral pockets for individually receiving successive articles and of a size corresponding to the given article size, said table being replaceable with selected tables having different sizes and numbers of article receiving pockets, said gear train having a gear therein which is replaceable with a gear of a different size to drive said table at selectively different rotational speeds corresponding to the circumferential distance between pocket centers to maintain the same time cycle of through put for each individual article irrespective of table replacement.

11. The mechanism of claim 10 in which said replaceable gear is disposed at one end of the gear train to provide minimum adjustment of said train when said gear is changed for one of a different size.

References Cited in the file of this patent

UNITED STATES PATENTS

| | | |
|---|---|---|
| 529,266 | Hill | Nov. 13, 1894 |
| 1,143,819 | Failing | June 22, 1915 |
| 2,301,543 | Hlavaty | Nov. 10, 1942 |
| 2,528,912 | Rappaport et al. | Nov. 7, 1952 |
| 2,660,069 | Horne et al. | Nov. 24, 1953 |